United States Patent
Weisser et al.

[11] Patent Number: 6,020,066
[45] Date of Patent: Feb. 1, 2000

[54] MICROCAPSULES USING IMINOOXADIAZINEDIONE POLYISOCYANATES

[75] Inventors: Jürgen Weisser, Dormagen; Frank Richter, Leverkusen; Carl-Gerd Dieris, Dormagen; Wolfgang Krohn, Köln, all of Germany

[73] Assignee: Bayer Aktiengesellschaft, Leverkusen, Germany

[21] Appl. No.: 08/956,821

[22] Filed: Oct. 23, 1997

[30] Foreign Application Priority Data

Nov. 8, 1996 [DE] Germany ............................ 196 46 110

[51] Int. Cl.[7] ................................ B32B 5/16; C08K 9/10; B41M 5/10; B41M 5/165
[52] U.S. Cl. .................... 428/402.21; 264/4.1; 264/4.33; 264/4.7; 427/146; 427/149; 427/153; 428/402.2; 428/914; 462/69; 523/210; 528/68; 528/73
[58] Field of Search ..................... 264/4.1, 4.33, 264/4.7; 428/402.2, 402.21, 914; 462/69; 427/146, 149, 153; 523/210; 528/68, 73

[56] References Cited

U.S. PATENT DOCUMENTS

| | | | |
|---|---|---|---|
| 4,299,723 | 11/1981 | Dahm et al. | 252/316 |
| 4,668,580 | 5/1987 | Dahm et al. | 428/402 |
| 4,738,898 | 4/1988 | Vivant | 428/402 |
| 4,761,255 | 8/1988 | Dahm et al. | 264/4.7 |
| 5,013,838 | 5/1991 | Scholl | 544/193 |
| 5,164,126 | 11/1992 | Klishek et al. | 264/4.7 |
| 5,717,091 | 2/1998 | Richter et al. | 544/67 |

FOREIGN PATENT DOCUMENTS

| | | |
|---|---|---|
| 0016366 | 10/1980 | European Pat. Off. . |
| 0016378 | 10/1980 | European Pat. Off. . |
| 0164666 | 12/1985 | European Pat. Off. . |
| 0227562 | 7/1987 | European Pat. Off. . |

*Primary Examiner*—Rabon Sergent
*Attorney, Agent, or Firm*—Norris, McLaughlin & Marcus

[57] ABSTRACT

Novel microcapsules are characterized in that the walls thereof consist of reaction products of crosslinking agents with iminooxadiazinedione isocyanates or the walls thereof contain such reaction products. A process for the production of such microcapsules has also been found, as have carbonless copying papers containing such microcapsules.

16 Claims, No Drawings

MICROCAPSULES USING IMINOOXADIAZINEDIONE POLYISOCYANATES

The present invention relates to microcapsules having walls of polyureas and polyiminoureas, to a process for the production thereof and carbonless copying papers which contain such microcapsules containing colour formers.

Microcapsules are used, inter alia as microcapsule dispersions, in many applications, for example for the production of carbonless copying papers, in the pharmaceutical, plant protection, cosmetics, catalysis sectors and in the adhesives industry.

In the first-mentioned application, so-called colour formers are mixed with hydrophobic, largely inert oils and this mixture is microencapsulated, so producing aqueous capsule dispersions. The dispersed capsules conventionally have a diameter in the range from 3 to 25 μm.

The process for the production of carbonless copying papers generally proceeds by applying such a capsule dispersion onto paper, optionally together with binders, spacers and/or additives and combining such a paper coated with capsules (CB side) with a developer paper, the upper side of which contains a colour former developer. When this combination of papers is used, the microcapsules rupture under the mechanical pressure of a writing instrument. The oil containing the colour former comes into contact with the developer at this point, so forming an image of the writing on the side containing the developer (CF side).

Combined coatings, i.e. paper coatings containing a mixture of capsules and developer are also known. Copies of uncoated papers may be produced using such papers (SC papers).

Numerous physical, physical/chemical and chemical methods are known for the production of microcapsules.

Colour formers, plant protection products and cosmetics are frequently microen-capsulated using processes based on the chemical principle of so-called interfacial polymerisation or interfacial polyaddition. These processes may be performed industrially in a simple and reproducible manner. The latter applies in particular to interfacial polyaddition.

In the first stage of interfacial polyaddition, the substances to be encapsulated are dissolved in a hydrophobic oil, combined with a polyisocyanate capable of wall formation and then processed with water to yield an oil-in-water emulsion. The emulsified oil droplets are here of a size approximately corresponding to that of the subsequent microcapsule. The water phase of the emulsion conventionally contains protective colloids, for example polyvinyl alcohol, carboxymethylcellulose, emulsifiers and/or stabilisers in order to prevent the oil droplets from coalescing.

In the second phase, the capsule wall is formed by mixing the oil-in-water emulsion with a crosslinking agent which is capable of reacting at the interface between the oil and the water with the isocyanate dissolved in the oil to form a polymeric film. The crosslinking agents may be, for example, di- or polyamines, diols, polyols, polyfunctional amino alcohols, guanidine, guanidine salts and compounds derived therefrom.

The third stage of the process comprises post-treatment of the freshly produced capsule dispersion. In this stage, the reaction between the polyisocyanate and crosslinking agent is completed at a controlled temperature for a specified residence time and optionally with the addition of further auxiliary substances. Interfacial polyaddition processes of this type are described, for example, in U.S. Pat. No. 4 021 595, U.S. Pat. No. 4 193 889, U.S. Pat. No. 4 428 978, EP-A 0 392 876, DE-A 2 757 017 and EP-A 0 535 384.

Di- and/or more highly functional aliphatic or aromatic isocyanates are used in known processes. The polyisocyanates hitherto used for microencapsulation are usually aliphatic and are predominantly derived from the following basic units:

hexamethylene diisocyanate (HDI), HDI biurets, HDI isocyanurates, HDI uretidiones, HDI oxadiazinetriones, combinations of two or more of the above-stated types and reaction products of the above-stated types with mono- and/or polyhydroxyl compounds (urethanes, allophanates) and/or di- and/or polyamines (ureas, biurets) which contain free isocyanate groups.

There are some disadvantages associated with using polyisocyanates of the above-stated types in the production of microcapsules by the interfacial polyaddition process described above. Using hexamethylene diisocyanate is thus problematic due to its elevated vapour pressure and the known, unpleasant physiological characteristics of monomeric aliphatic diisocyanates. While polyisocyanates of the other types stated are indeed unproblematic in this respect, it has been found that, in order to produce the finest possible microcapsule dispersions, relatively high shear forces must frequently be applied to produce the described oil-in-water emulsion, which requires an elevated energy input. Furthermore, the capsule content in the finished dispersion is usually limited to at most approx. 45 wt.%.

The possibility of producing microcapsule dispersions having solids contents of above 40 wt.%, and exceptionally even of above 50 wt.%, has indeed been described in principle. However, this entails high costs, which increase proportionately with the desired solids content (cf. U.S. Pat. No. 5 164 126).

The polyisocyanates used for microencapsulation should also be sufficiently soluble in the hydrophobic oil. However, this is true only to a limited extent, in particular with regard to the polyisocyanate types derived from hexamethylene diisocyanate with uretdione, biuret, allophanate and/or isocyanate structures.

The object of the present invention was accordingly to provide microcapsules which, while retaining or improving the technical advantages of known microcapsules, require less energy during emulsification and permit higher capsule contents in the microcapsule dispersions without entailing particular costs.

Microcapsules have now been found which are characterised in that the walls thereof consist of reaction products of crosslinking agents containing $NH_2$ groups with isocyanates of the formula (I)

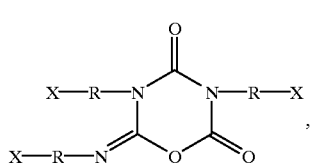

(I)

in which
the residues R are identical or different and each denote divalent, optionally substituted $C_1$–$C_{20}$ (cyclo)alkyl or divalent, optionally substituted $C_7$–$C_{20}$ aralkyl and
the residues X are identical or different and each denote NCO or a residue arising from the removal of N-attached substituents from oligomers of diisocyanates which contain urea, biuret, uretidione, isocyanurate, oxadiazinetrione, urethane, allophanate and/or iminooxadiazinedione structural units, or in that the walls thereof contain reaction products of crosslinking agents containing NH$_2$ groups with isocyanates of the formula (I).

The residues R may have saturated or unsaturated, linear or branched alkyl groups (also as aralkyl). Further substituents for R (other than X) which may be considered are, for example, halogen, nitrogen, oxygen and/or sulphur atoms.

The residues R in the formula (I) are preferably identical or different and denote divalent, optionally substituted C$_1$–C$_{10}$ alkyl. The residues X are preferably identical or different and denote NCO and/or a residue arising from the removal of N-attached substituents from oligomers of isocyanates of the formula (II)

$$OCN-R-NCO \qquad (II),$$

in which R has the meaning stated in the formula (I),
wherein the oligomers contain urea, biuret, uretidione, isocyanurate, oxadiazinetrione, urethane, allophanate and/or iminooxadiazinedione structural units. The oligomers may, for example, have an average degree of oligomerisation 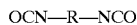 of 2 to 20, wherein n means the number of diisocyanate units incorporated in the oligomer molecule.

Particularly preferably, all the residues R are identical. The residues X are particularly preferably identical or different and denote NCO and/or one of the preferred residues, wherein residues having isocyanurate and iminooxadiazinedione structural units constitute at least 50 mol.% of all the residues X.

Very particularly preferably, all the residues R are —(CH$_2$)$_6$— groups.

The isocyanates of the formula (I) may be used as pure compounds, as any desired mixtures of compounds of the formula (I) with each other, as mixtures of a pure compound of the formula (I) with one or more other isocyanates or as mixtures of two or more compounds of the formula (I) with one or more other isocyanates.

The other isocyanates may comprise the most varied aliphatic, aromatic and aromatic/aliphatic di- and more highly functional isocyanates, preferably those which are known for the production of microcapsules. Particularly preferred other isocyanates are hexamethylene dulsocyanate, isophorone diisocyanate and/or hexamethylene diisocyanate and isophorone diisocyanate derivatives having free isocyanate groups and containing biuret, isocyanurate, uretidione and/or oxadiazinetrione groups. Some so-called other polyisocyanates are described, for example, in EP-A 227 562, EP-A 164 666 and EP-A 16 378.

If isocyanates to be used according to the invention are used mixed with other isocyanates, then these mixtures preferably contain at least 20 wt. % of the isocyanates to be used according to the invention. Particularly preferred mixtures are those containing at least 30 wt. % of the isocyanates to be used according to the invention.

Isocyanate mixtures which may be used according to the invention may arise directly from isocyanate production, but they may also be produced by mixing individual components, wherein individual components may be both individual compounds and themselves mixtures.

Isocyanates of the formula (I) or mixtures containing such isocyanates may be obtained, for example, by oligomerising suitable polyisocyanates/polyisocyanate mixtures having an NCO content of less than 75 wt. % under the influence of catalysts based on hydrogen (poly)fluorides. The catalysts may, for example, be of the formula (III)

$$\{M[nF^-(HF)_m]\} \qquad (III),$$

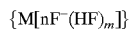

in which
m is greater than zero, preferably greater than 0.1, particularly preferred greater than 0.5 and
M is an n-charged cation or an n-valent residue.

Some compounds of the formula (III) are commercially available or may simply be produced in any desired stoichiometry by blending suitable fluorides with the appropriate quantity of hydrogen fluoride. Hydrogen fluoride may here be added, for example, as a solution in aprotic or aprotic organic solvent. Hydrogen fluoride/amine complexes, for example with pyridine and melamine, are also commercially available and may be used in this connection. Hydrogen fluorides of the formula (III) present no problems physiologically. Furthermore, addition of hydrogen fluoride onto isocyanates to form carbamoyl fluorides virtually excludes the presence of free hydrogen fluoride in the resultant compounds of the formula (I).

The hydrogen fluoride content of the stated catalyst systems may vary within broad limits. It is thus immaterial whether this content comprises defined compounds such as monohydrogen difluorides, dihydrogen trifluorides etc., which are known, for example, in the form of the potassium salts thereof, or any desired mixtures of such defined compounds with excess fluoride on the one hand or with excess hydrogen fluoride on the other.

It is immaterial for the production of isocyanates of the formula (I) and the mixtures containing them whether the catalyst is soluble in the polyisocyanate to be oligomerised (homogeneous catalysis) or not (heterogeneous catalysis). Further substances or mixtures of substance may also be added during catalysis, for example amines, alcohols and/or phenols, solvents for the catalyst and/or the starting isocyanate, anti-oxidants and/or matrices for adsorption or covalent bonding of the catalyst. The hydrogen fluoride necessary to form the compounds of the formula (III) may also be added separately to the isocyanate (mixture), optionally in dissolved form. Moreover, any desired substances which, under the reaction conditions, provide hydrogen fluoride for catalysis may also (additionally) be used. Any desired carbamoyl fluorides are thus, for example, suitable for this purpose.

The isocyanates of the formula (I) and mixtures containing them may be produced, for example, within a temperature range from 20 to 200° C., preferably from 30 to 90° C. The reaction may proceed to completion or be interrupted at any desired degree of conversion. In the latter case, the reaction may be terminated, for example, by the addition of acids or acid derivatives (for example benzoyl chloride, acidic esters of acids containing phosphorus or acids containing phosphorus, silylated sulphonic acids, mineral acids, but not hydrogen fluoride), by adsorption of the catalyst and subsequent separation by filtration or by thermal deactivation. Catalyst concentrations, relative to the introduced polyisocyanate, may, for example, be between 5 ppm and 5 wt.%.

In parallel with the formation of iminooxadiazinedione isocyanates, the following reactions may optionally occur, trimerisation to form isocyanurate structures, dimerisation to form uretidione structures, incorporation of CO$_2$ to form oxadiazinetrione, urethanisation and/or allophanatisation.

Polyisocyanates usable according to the invention may be produced using, for example, known aliphatic, cycloaliphatic and araliphatic polyisocyanates having an NCO content of less than 70 wt. % in pure form or as any desired mixtures with each other. Polyisocyanates which may be mentioned by way of example are: (methyl)cyclohexane diisocyanates, ethylcyclohexane diisocyanates, propylcyclohexane diisocyanates, methyldiethylcyclohexane diisocyanates, propane diisocyanates, butane diisocyanates, pentane diisocyanates, hexane diisocyanates (for example HDI), heptane diisocyanates, octane diisocyanates, nonane di- and triisocyanates, decane di- and triisocyanates, undecane di- and triisocyanates, dodecane di- and triisocyanates, isophorone diisocyanate, bis (isocyanatocyclohexyl)methane and 4(3)-isocyanatomethyl-1-methylcyclohexyl isocyanate.

Isocyanates of the formula (I), mixtures containing them and the production thereof are described in a prior patent application from the present applicant.

The elevated chemical and mechanical stability of the capsule walls produced with isocyanates of the formula (I) and crosslinking agents containing $NH_2$ groups is surprising, as is the good solubility of these isocyanates in the organic, water-immiscible solvents which are inert towards isocyanates and may be considered for microencapsulation (for example, alkylaromatic hydrocarbons such as diisopropylnaphthalene, substituted diphenyls such as sec.-butyl diphenyl, phenylxylylethanes, chlorinated paraffins, phthalates, natural oils such as soya oil or rapeseed oil and low-melting fats such as coconut butter).

In industrial encapsulation applications, the above-stated oils may optionally be extended with aliphatic hydrocarbons of a synthetic or natural origin in order to reduce costs or to adjust density. These extenders may be, for example, paraffin mixtures (for example Exxsol® grades), isohexadecane, hydrogenated naphthenic petroleum fractions (for example Nytex®, Nyflex® and Gravex® grades) and dodecylbenzenes (for example Marlikan®).

Isocyanates of the formula (I) are particularly suitable for encapsulation applications in which the above-stated oils or mixtures of such oils with extenders are used.

The microcapsules according to the invention are preferably used for the production of carbonless copying papers. In this case, they contain colour formers dissolved in oils as the substance to be encapsulated. Colour formers of the most varied kinds may be considered for this purpose, in particular triphenylmethane compounds, diphenylmethane compounds, bisindolylphthalide compounds, bisarylcarbazolylmethane compounds, xanthene compounds, benzoxazine compounds, thiazine compounds and spiropyran compounds, in particular those which are known as colour formers for the production of carbonless copying papers. Mixtures of two or more colour formers may also be used. Some usable colour formers are described, for example, in EP-A 591 106, EP-A 315 901, EP-A 234 349, DE-A 3 622 262 and EP-A 187 329.

The aqueous phase in the production of microcapsules according to the invention may optionally contain emulsifiers, stabilisers and/or coalescence-inhibiting substances. Emulsifiers may optionally also be present in the oil phase. The quantity of such additives may, for example, be within the range from 0.01 to 2 wt. %, relative to the particular phase.

The microcapsules according to the invention may contain not only colour formers, but also other encapsulated materials, for example perfume oils, adhesives, pharmaceuticals, insecticides, herbicides or repellants. The substances to be encapsulated must, of course, not react with isocyanates under the encapsulation conditions.

Microcapsules according to the invention are produced from isocyanates of the formula (I) by reaction with crosslinking agents containing $NH_2$ groups. The crosslinking agents are capable of reacting with isocyanate groups at a phase interface. The following compounds may, for example, be considered for this purpose in pure form or as mixtures with each other: hydrazine, guanidine and the salts thereof, hydroxylamine, di- and polyamines and aminoalcohols. Guanidine carbonate is a preferred guanidine salt. When guanidine salts of strong acids are used, it is necessary to add a base. Examples of di- and polyamines and aminoalcohols are: ethylenediamine, hexamethylenediamine, isophoronediamine, diethylenetriamine, ethanolamine, diethanolamine and triethanolamine. Water may also, in principle, act as a crosslinking agent by producing an amino group by addition onto an NCO group with subsequent elimination of $CO_2$, which amino group may then enter into a crosslinking reaction with an NCO group.

Preferred microcapsules are those having walls produced from isocyanates to be used according to the invention, guanidine carbonate, diethylenetriamine or guanidine carbonate/diethylenetriamine mixtures as the crosslinking agent.

The quantity of the isocyanates to be used according to the invention is within the range usual for interfacial polyaddition processes, for example between 2 and 20 wt. % of wall content (cf. definition 1), relative to the entire oil phase provided for encapsulation. A wall content in the range between 4 and 15 wt. % is preferred. When calculating the wall content, the crosslinking agent required for the reaction is disregarded for simplicity's sake.

Definition 1

$$\text{Percentage wall content} = \frac{\text{mass}_{isocyanate}}{\text{mass}_{oil\ phase\ to\ be\ encapsulated} + \text{mass}_{isocyanate}} \times 100$$

The theoretical quantity of crosslinking agent necessary for wall formation is calculated from a) the isocyanate group content of the isocyanate used and b) the reactive amino and/or hydroxyl group content of the crosslinking agent component used. These quantity ratios are conventionally expressed by so-called equivalent weights.

Definition 2

$$\text{Equivalent weight}_{isocyanate} = \frac{42}{\text{NCOcontent}*} \times 100$$

*) = for example, to be determined titrimetrically (DIN 53 185)

Definition 3

$$\text{Equivalent weight}_{crosslinking\ agent} = \frac{\text{molecular weight}_{crosslinking\ agent}}{\text{number of reactive groups per molecule}}$$

At least theoretically, the same number of $NH_2$ and/or OH groups are necessary to react with all the NCO groups present in the oil phase. It is thus advantageous to use the isocyanate and the crosslinking agent in the ratio of the equivalent weights thereof. It is, however, also possible to use either less than the stoichiometrically calculated quantity of crosslinking agent, as a secondary reaction of the isocyanate with the water present in excess cannot be excluded in interfacial polyaddition processes, or to use an excess of the crosslinking component, because such an excess is not critical.

Accordingly, the crosslinking agent is in particular used in a quantity of between 50 and 150 wt. % of the theoretically calculated quantity. This quantity is preferably between 50 and 100 wt. %, relative to the theoretically calculated quantity.

The present invention also relates to a process for the production of microcapsules in which an oil phase, which contains an organic, water-immiscible solvent which is inert towards isocyanates, the substance to be encapsulated and isocyanates of the formula (I), is emulsified into a water phase, which optionally contains additives, and a crosslinking agent, which contains $NH_2$ groups and is capable of reacting with isocyanate groups, is added to the emulsion.

The present invention finally also relates to carbonless copying papers which contain colour formers in microencapsulated form and are characterised in that the walls of the microcapsules contain reaction products of isocyanates of the formula (I) with crosslinking agents.

The above-stated explanations with regard to the microcapsules according to the invention apply mulatis mutandis to the microcapsule dispersion production process according to the invention and to the carbonless copying papers produced therefrom.

The present invention has the advantage that production of the microcapsules demands distinctly less energy and that more highly concentrated capsule dispersions may be produced. The microcapsules according to the invention are furthermore distinguished by elevated chemical stability and good ageing resistance.

This is all the more surprising in that the iminooxadiazinediones to be used according to the invention could be considered to be constitutional isomers of isocyanurates (so-called trimerisation products), which have long been known, or could also be considered formally as isocyanate trimers. On the other hand, the iminooxadiazinediones to be used according to the invention may be considered to be structurally related to oxadiazinetriones by the cyclic anhydride segment thereof. Oxadiazinetriones have long been established in microencapsulation technology. Accordingly, no improvement was actually to have been expected from replacing the above-stated polyisocyanates known for microencapsulation with those to be used according to the invention (c.f. also in this connection the formulae (I), (IV) and (V) shown below).

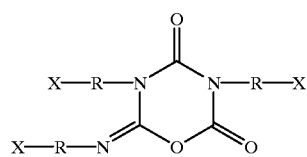

(I)

Iminooxadiazinedione type, according to the invention

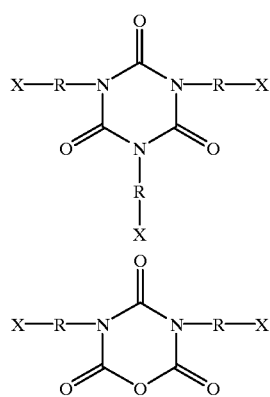

(IV)

(V)

The advantages achievable according to the invention are particularly marked when the isocyanates to be used according to the invention are used in combination with guanidine carbonate as the crosslinking agent.

EXAMPLES

Examples 1 to 12 relate to microcapsule dispersions for carbonless copying papers.

EXAMPLE 1 (by way of comparison)

A constant stream (32.0 kg/h) of bis(isocyanatohexyl) oxadiazinetrione oligomer mixture was pumped through a static mixer together with a constant stream (288.0 kg/h) of colour former solution (3 wt. % crystal violet lactone in diisopropylnaphthalene), so producing a largely homogeneous organic phase.

This was continuously introduced into a conventional emulsifying unit together with a stream of a water phase (420.5 kg/h) consisting of deionised water containing 1 wt. % of polyvinyl alcohol (AIRVOL® 523, Air Products Inc.). This emulsifying unit was constructed using the rotor/stator principle, which means that rapidly rotating, slotted disks, which move at an elevated circumferential speed in stationary, likewise slotted stator chambers, generate a strong shear field.

In such emulsifying units, the oil and water phase are converted into a finely divided emulsion within a few seconds, wherein the particle size in the emulsion, is very close to the size of the subsequent microcapsules. The size of the oil droplets may be controlled by means of the rotational speed of the machine.

In the present Example, a very high rotational speed of 2400 rpm had to be set in order to achieve an average particle size of 6.8 $\mu$m (measured using a conventional commercial Multisizer II unit, Coulter Electronics Inc.).

The approx. 40 wt. % emulsion stream (740.5 kg/h) leaving the emulsifying unit was passed via a cooler into a maturing tank and continuously mixed therein with a 9 wt. % aqueous solution of diethylenetriamine in deionised water (=crosslinking agent solution). Once the tank was full, the emulsion stream and crosslinking agent feeds were stopped and the tank contents were heated by wall heating to a temperature of approx. 60° C. with slow stirring. After two hours' stirring at this temperature, an approx. 40 wt. % capsule dispersion was obtained (average capsule diameter 6.5 $\mu$m, measured as stated above) which was used to produce a carbonless copying paper.

An x wt. % emulsion stream or x wt. % capsule dispersion is taken to mean the content by weight of isocyanate+colour former solution relative to the total weight of the emulsion or dispersion.

EXAMPLE 2 (according to the invention)

The industrial apparatus used in Example 1 was used, but the nature of the isocyanate, the quantity of the colour former solution and the quantity of the water phase were changed. The following were used:

An isocyanate which had been obtained according to Example 15 (32.0 kg/h).

The same colour former solution as in Example 1 (368 kg/h).

The same water phase as in Example 1 (319.1 kg/h).

A 10 wt. % solution of guanidine carbonate in water (80.9 kg/h) was used as the crosslinking agent solution. Since the crosslinking agent is added only once the emulsion has formed, it has no effect on the energy required to form the emulsion.

In this Example, a rotational speed of only 1800 rpm was required in order to achieve a droplet size of 6.7 μm, despite the emulsion being a 50 wt. % emulsion.

It is evident that using the isocyanate to be used according to the invention allows the production of equally finely divided and even more highly concentrated emulsions at a distinctly lower energy input per unit mass of the oil phase than are obtainable when using known isocyanates (719.1 kg of 50 wt. % emulsion according to the present Example instead of 740.5 kg of 40 wt. % emulsion according to Example 1).

In this Example too, the emulsifying unit was stopped once the ripening tank had been filled with the crosslinked 50 wt. % emulsion. The tank contents were heated by jacket heating to 65° C. and stirred at this temperature for 2 hours.

A 50 wt. % microcapsule dispersion (average capsule diameter 6.4 μm) was obtained, which was used to produce a high quality carbonless copying paper.

EXAMPLES 3 to 11 (according to the invention)
and EXAMPLE 12 (not according to the invention)

General Method

Sub-stages A to I were performed in succession.

A Colour former solutions

Colour former solutions 1 to 3 were produced by dissolving the corresponding pulverulent colour formers (commercial products) in various oils (commercial products) at a temperature of approx. 110° C.

Colour former solution 1

95.5 wt. % of diisopropylnaphthalene (KMC 113, RüTAG AG)

31.5 wt. % of crystal violet lactone (Pergascript® Blau 12R, CIBA GEIGY AG)

0.67 wt. % of Pergascript® Blau SRB (CIBA GEIGY AG) and 0.67 wt. % of Pergascript® Rot I6B (CIBA GEIGY AG)

Colour former solution 2

95.0 wt. % of coconut butter (Cocopur®, W. Rau GmbH)

0.65 wt. % of Pergascript® Blau SRB 0.75 wt. % of Pergascript® Grün I2GN (CIBA GEIGY AG)

0.35 wt. % of Pergascript® Rot I6B 1.63 wt. % of colour former PSD 184 (Nippon Soda) and 1.62 wt. % of colour former Black 15 (Yamamoto Chemicals)

Colour former solution 3

76 wt. % of alkylaromatic hydrocarbon SAS 296 (Nisseki Chemical Texas)

19 wt. % of Nytex® 800

0.65 wt. % of Pergascript® Blau SRB 0.75 wt. % of Pergascript® Grüin I2GN 0.35 wt. % of Pergascript® Rot I6B 1.63 wt. % of colour former PSD 184 (Nippon Soda) and 1.62 wt. % of colour former Black 15 (Yamamoto Chemicals).

B Production of polyvinyl alcohol solution (water phase)

A 1.0 wt. % polyvinyl alcohol solution, produced by mixing AIRVOL® 523 with the appropriate quantity of cold, deionised water, 15 minutes' swelling at room temperature and then heating to 100° C. until dissolution was complete, was used in all cases.

C Production of crosslinking agent solution

A 10 wt. % guanidine carbonate solution (GUCA) and a 9 wt. % diethylenetriamine solution (DETA), both produced by dissolving the corresponding crosslinking agent in deionised water at room temperature, were used.

D Production of active oil phase

The "active oil phase" is taken to mean the mixture of colour former solution, optionally extender and the polyisocyanate used. It was produced by mixing the colour former solution with the isocyanate component used in a glass beaker at room temperature until it looked homogeneous.

E Production of pre-emulsion

This was obtained by mixing the active oil phase with the polyvinyl alcohol solution in a high speed laboratory mixer at room temperature.

F Production of fine emulsion

The pre-emulsion was converted into a fine emulsion of the desired particle size in a conventional commercial, high speed laboratory emulsifying unit (Megatron®, KINEMATICA AG), wherein the necessary rotational speed was determined in each case by preliminary testing. The rotational speed in rpm is a measure of the emulsifying energy required. A temperature of 30 to 33° C. was maintained during the emulsification stage by external cooling.

G Crosslinking of fine emulsion

A calculated quantity of crosslinking agent solution was added at room temperature with slow stirring to the weighed quantity of fine emulsion.

H Ripening of capsule dispersion

The crosslinked dispersions were heated in a water bath with slow stirring to 60° C. (when crosslinked with diethylenetriamine) or to 70 to 80° C. (when crosslinked with guanidine carbonate) and stirred for a further 2 hours at this temperature.

I Testing of capsule dispersion

The following properties of the resultant capsule dispersion were determined:

a) solids content by means of a conventional commercial dry balance, b) particle size with a conventional commercial particle size meter and c) capsule leak-proofness by knife-coating a conventional commercial developer paper with the capsule dispersion (corresponding to 2 g of dry capsules per $m^2$ of paper), subsequent drying in a stream of air at room temperature and visual evaluation, wherein blue or black colouration is an indication of leaky capsules and, in the case of leak-proof capsules, no discolouration in comparison with the uncoated paper is visually detectable.

The solids content is the dry capsule content of the capsule dispersion. Dry capsules comprise the fractions of the capsule dispersion which are not volatile at a drying temperature of 150° C. and standard air pressure.

Examples 3 to 11 demonstrate that leak-proof, non-agglomerated microcapsules may be produced using the interfacial polyaddition process from the isocyanates to be used according to the invention alone or mixed with other isocyanates, which microcapsules are particularly suitable for the production of carbonless copying papers. Example 12 shows that microcapsules having poor properties in use are obtained when isocyanates other than those to be used according to the invention and an otherwise comparable method are used. Example 13 shows the superiority of the isocyanates to be used according to the invention in the production of highly concentrated, agglomerate-free microcapsule dispersions.

Details of Examples 3 to 12 may be found in the following table.

TABLE

| Example no. | Isocyanate (mixture)[1] | NCO content of isocyanate wt. %[2] | Wall content wt. %[3] | Crosslinking agent Type | Quantity wt. %[4] | Colour former solution no. | Emulsification energy (rpm) | Average capsule size (μm) | Leak-proofness | Concentration of capsule dispersion (wt. %) |
|---|---|---|---|---|---|---|---|---|---|---|
| 3 | A | 23.6 | 7 | GUCA | 100 | 1 | 7500 | 7.5 | leak-proof | 52.0 |
| 4 | A | 23.6 | 5 | GUCA | 100 | 1 | 6800 | 7.3 | leak-proof | 51.2 |
| 5 | A | 23.6 | 10 | GUCA | 100 | 1 | 7800 | 7.6 | leak-proof | 52.2 |
| 6 | A | 23.6 | 7 | GUCA | 100 | 2 | 6300 | 6.4 | leak-proof | 49.9 |
| 7 | A | 23.6 | 7 | GUCA + DETA | 50 | 3 | 7600 | 6.8 | leak-proof | 51.0 |
| 8 | A | 23.6 | 7 | GUCA + DETA | 100 | 3 | 7600 | 6.9 | leak-proof | 50.5 |
| 9 | A + UD, 1:1 | 22.7 | 10 | GUCA | 100 | 1 | 7800 | 7.2 | leak-proof | 50.9 |
| 10 | A + BU, 1:4 | 23.1 | 10 | GUCA | 100 | 1 | 8500 | 7.7 | leak-proof | 51.6 |
| 11 | A + IC, 1:9 | 22.0 | 10 | GUCA | 50 | 1 | 9000 | 7.6 | light blue | 50.2 |
| 12 | ON (comp.) | 20.3 | 10 | GUCA | 100 | 1 | 10500 | [6] | blue | [6] |

[1]A = obtained according to Example 15, UD = uretidione polyisocyanate (Desmodur ® N 3400), BU = biuret polyisocyanate (Desmodur ® N 3200), IC = isocyanurate polyisocyanate (Desmodur ® N 3300), ON = oxadiazinetrione polyisocyanate; numerical values are ratios by weight.
[2]Determined titrimetrically to DIN 53 185.
[3]Determine according to definition 1 in the specification.
[4]Relative to the stoichiometrically required quantity.
[5]45 parts by weight of GUCA and 34.3 parts by weight of DETA.
[6]Agglomeration occurred during capsule formation, concentration of capsule dispersion not determined.

EXAMPLE 13

This Example shows the superiority of the isocyanates to be used according to the invention with regard to the production of highly concentrated, agglomerate-free microcapsule dispersions.

A coarse pre-emulsion was produced from 444.4 g of the colour former solution 1 also used in Examples 3 to 12 and 33.45 g of the isocyanate obtained according to Example 15 and a mixture of 234 g of a 1 wt. % aqueous polyvinyl alcohol solution and 84.6 g of a 10 wt. % aqueous guanidine carbonate solution (both produced as described in Examples 3 to 12) using a laboratory stirrer. This preemulsion was converted into a fine emulsion at 25° C. at a rotational speed of 10000 rpm in a high speed laboratory emulsifying unit (Megatron®, KINEMATICA AG). This was heated to 60° C. with gentle stirring within one hour by means of a water bath and stirred for one hour further at this temperature. The temperature was then raised to 75° C. and stirring continued for a further 1.5 hours. An agglomerate-free microcapsule dispersion was obtained having a solids content of 60.2 wt. %, a viscosity of 145 mPa −s at 25° C. and an average capsule size of 8.8 μm. The capsules were leak-proof. Solids content, particle size and capsule leak-proofness were determined as stated in Examples 3 to 12, while viscosity was determined using a conventional commercial rotational viscometer.

EXAMPLE 14

The following Example relates to microencapsulation of an insect repellant.

230 g of N,N-diethyltolylamide were dissolved with gentle heating in 230 g of coconut butter (COCOPUR®, Walter Rau GmbH, Neuss). The clear solution was combined with 40 g of the isocyanate obtained according to Example 15 and stirred at 30° C. until dissolution was complete. This produced solution A. A coarse pre-emulsion was produced from solution A and 400 g of a 1.2 wt. % solution of polyvinyl alcohol (AIRVOL® 325, Air Products) by means of a laboratory stirrer and this was converted into a finely divided emulsion at approx. 8000 rpm within 90 seconds using a high speed laboratory emulsifying unit (MS 10/AA 11G, Fluid Kotthoff GmbH, Essen). 101 g of a solution of 10 wt. % of guanidine carbonate in deionised water were then gently stirred in. The mixture was simultaneously heated to 70° C. with a water bath and stirred for a further 2 hours at 70° C.

A microcapsule dispersion was obtained having an average particle size of 13.5 μm and a concentration of 52.5 wt. %, in which the repellant was present in microencapsulated form.

EXAMPLE 15

Production of an isocyanate to be used according to the invention:

The gases dissolved in 2000 g of hexamethylene diisocyanate were initially removed at room temperature and a pressure of approx. 0.1 mbar over the course of 1 hour in a 3 litre, four-necked flask fitted with an internal thermometer, stirrer, reflux condenser, gas inlet line and metering apparatus for the catalyst solution and the diisocyanate was then heated to an internal temperature of 50° C. under a gentle stream of nitrogen. Then, over the course of 90 minutes at this temperature, a total of 4.3 g of a 5 wt. % solution of benzyltrimethylammonium fluoride (Aldrich) and 5 equivalents of HF (calculated as F$^-$) in 2-ethylhexanol were added in portions in such a manner that the internal temperature did not exceed 65° C. Once a refractive index $n_D^{20}$ of 1.4638 was reached, trimerisation was terminated by the addition of 0.4 g of di-n-butyl phosphate, stirring was continued for a further hour at 50° C. and unreacted monomeric diisocyanates were then separated by film distillation in a short-path evaporator at 0.1 mbar and a temperature of the heating medium of 170° C.

480 g of a colourless, clear isocyanate mixture were obtained having the following data:

NCO content: 23.6 wt. %

Residual monomer content: 0.01 wt. % hexamethylene diisocyanate

Molar ratio of isocyanurates to iminooxadiazinediones of the formula (I): 50:50

What is claimed is:

1. Microcapsules, the walls of which consist of reaction products of crosslinking agents containing $NH_2$ groups with isocyanates comprising isocyanates of the formula

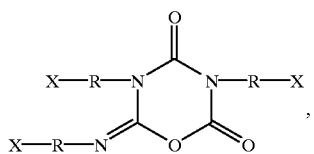

(I)

in which the residues R are identical or different and each denote divalent, optionally substituted $C_1$–$C_{20}$ (cyclo)alkyl or divalent, optionally substituted $C_7$–$C_{20}$ aralkyl and the residues X each denote NCO.

2. Microcapsules of claim 1, in which the isocyanates of the formula (I) are used as a mixture with other diisocyanates, wherein these mixtures contain at least 20 wt. % of isocyanates of the formula (I).

3. Microcapsules of claim 1, in which the crosslinking agent is guanidine carbonate.

4. A process for the production of microcapsules of claim 1, in which an oil phase, which contains isocyanates of the formula (I)

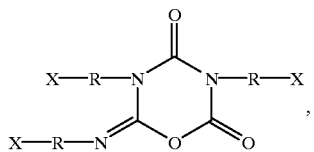

(I)

in which the residues R are identical or different and each denote divalent, optionally substituted $C_1$–$C_{20}$ (cyclo)alkyl or divalent, optionally substituted $C_7$–$C_{20}$ aralkyl and the residues X each denote NCO and an organic, water-immiscible solvent which is inert towards isocyanates of the formula (I), is emulsified into a water phase and a crosslinking agent, which contains $NH_2$ groups and is capable of reacting with isocyanate groups, is added to the emulsion.

5. The process of claim 4, in which the water phase contains additives.

6. The process of claim 4, in which the organic, water-immiscible solvent which is inert towards isocyanates is an alkylaromatic hydrocarbons substituted diphenyl, a chlorinated paraffin, a phthalate, a natural oil or coconut butter.

7. The process of claim 4, in which the water phase contains one or more of emulsifiers, stabilisers and coalescence-inhibiting substances.

8. Carbonless copying papers containing color formers which are microencapsulated in microcapsules according to claim 1.

9. Microcapsules, the walls of which contain reaction products of crosslinking agents containing $NH_2$ groups with isocyanates of the formula (I)

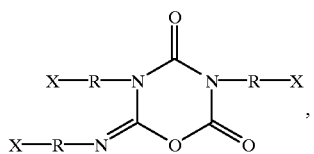

(I)

in which the residues R are identical or different and each denote divalent, optionally substituted $C_1$–$C_{20}$ (cyclo)alkyl or divalent, optionally substituted $C_7$–$C_{20}$ aralkyl and the residues X each denote NCO.

10. Microcapsules of claim 9, in which the isocyanates of the formula (I) are used as a mixture with other diisocyanates, wherein these mixtures contain at least 20 wt. % of isocyanates of the formula (I).

11. Microcapsules of claim 9, in which the crosslinking agent is guanidine carbonate.

12. A process for the production of microcapsules of claim 9, in which an oil phase, which contains isocyanates of the formula (I)

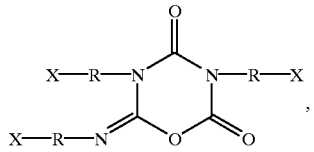

(I)

in which the residues R are identical or different and each denote divalent, optionally substituted $C_1$–$C_{20}$ (cyclo)alkyl or divalent, optionally substituted $C_7$–$C_{20}$ aralkyl and the residues X each denote NCO and an organic, water-immiscible solvent which is inert towards isocyanates of the formula (I), is emulsified into a water phase and a crosslinking agent, which contains $NH_2$ groups and is capable of reacting with isocyanate groups, is added to the emulsion.

13. The process of claim 12, in which the water phase contains additives.

14. The process of claim 12, in which the organic, water-immiscible solvent which is inert towards isocyanates is an alkylaromatic hydrocarbons substituted diphenyl, a chlorinated paraffin, a phthalate, a natural oil or coconut butter.

15. The process of claim 12, in which the water phase contains one or more of emulsifiers, stabilisers and coalescence-inhibiting substances.

16. Carbonless copying papers containing color formers which are microencapsulated in microcapsules according to claim 9.

* * * * *